United States Patent [19]

Porter et al.

[11] 4,226,136
[45] Oct. 7, 1980

[54] GEAR DRIVE ASSEMBLY

[75] Inventors: Troy L. Porter, Wheeling; Rudolph J. Belansky, Elmhurst, both of Ill.

[73] Assignee: Illinois Tool Works Inc., Chicago, Ill.

[21] Appl. No.: 42,167

[22] Filed: May 24, 1979

[51] Int. Cl.³ .............................................. F16H 1/16
[52] U.S. Cl. ...................................... 74/416; 74/425; 74/458; 74/459.5
[58] Field of Search ................ 74/416, 417, 425, 458, 74/459.5; 49/349, 350

[56] References Cited

U.S. PATENT DOCUMENTS

| | | | |
|---|---|---|---|
| 2,896,467 | 7/1959 | Saari | 74/459.5 |
| 2,908,187 | 10/1959 | Saari | 74/459.5 |
| 2,954,704 | 10/1960 | Saari | 74/466 |
| 3,524,361 | 8/1970 | Iyoi et al. | 74/417 |
| 3,631,736 | 1/1972 | Saari | 74/462 |
| 3,665,774 | 5/1972 | Bauhus et al. | 74/416 |
| 3,745,849 | 7/1973 | Matte | 74/416 |
| 3,768,326 | 10/1973 | Georgiev et al. | 74/425 |
| 3,871,248 | 3/1975 | Barish | 74/665 P |
| 3,977,268 | 8/1976 | Seabrook | 74/417 |
| 4,034,621 | 7/1977 | Ritter, Jr. | 74/424 |

Primary Examiner—C. J. Husar
Assistant Examiner—Conrad Berman
Attorney, Agent, or Firm—Thomas W. Buckman; Richard K. Thomson

[57] ABSTRACT

A compact drive assembly has a skew axis input gear set and a parallel axis output gear set. The input gear set includes a pinion having at least one helical thread thereon which drivingly engages a face gear. The face gear of the input gear set and the spur gear of the output gear set are integrally molded of a suitable plastic material forming a cluster gear. The output gear of the output gear set has a tooth configuration which is compatible with that of the spur gear which drives it. The gear assembly is particularly adapted for use in a power operated automobile window actuator and has the following advantages over existing actuators: (a) 50% reduction in size and weight, (b) capable of performing much higher input/output reductions despite decreased size, (c) needs no brake since the assembly is self-locking, (d) can be used with a smaller high speed motor which is less expensive.

11 Claims, 4 Drawing Figures

GEAR DRIVE ASSEMBLY

BACKGROUND OF THE INVENTION

The present invention involves a compact gear drive assembly for use in a window actuator. More specifically, the drive assembly can be used with a small high speed motor to form a power actuator for an electrically operated automobile window.

Prior art window actuators have been incapable of performing a gear reduction as substantial as that available with the present invention. Even so, those systems are comparitively large and heavy requiring a large, low speed motor to operate them. This bulky drive assembly necessitates a thicker door which adds even more weight to the car. In an era where the current thrust of the automotive industry is to reduce the overall weight of the vehicle in order to improve gas mileage, these limitations of the prior actuators make them wholly unacceptable.

SUMMARY OF THE INVENTION

It is an object of this invention to produce a compact gear drive assembly capable of providing an overall gear reduction in the range of between 115 and 200 to 1.

Further, it is an object of the invention to provide a gear drive assembly for use in an automobile window actuator which is much lighter in weight, has a higher mechanical advantage and will reduce the weight and thickness of the actuator by 50%.

It is a further object of the invention to provide a gear drive assembly which is self-locking obviating the use of a brake or other such back drive preventative means.

It is another object of the invention to provide a gear drive assembly which is quiet running, is easier and cheaper to manufacture and can be used with a smaller, less expensive high-speed motor.

It is a further object to produce a gear drive assembly in which a number of the components are made of a light weight plastic material but have sufficient strength to withstand heavy loading, sufficient wearability to provide good wear life, and sufficient resilience to tolerate peak shock loads.

These and other objects of the invention are achieved by a gear drive assembly comprised of a skew axis input gear set and a parallel axis output gear set. The input set includes a cylindrical pinion which can have one or more helical threads and a face gear. The output set includes a spur pinion which is coaxial with and integrally molded with the face gear forming a cluster gear. The spur pinion teeth are on the same side of the face gear as the gear teeth thereof and extend to the base of the face gear so that the teeth of these two gears overlap.

By proper selection of the gear ratios and the tooth configurations, the operational noise can be minimized, the forward driving efficiency maximized and the back driving efficiency made low enough to render the gear assembly self-locking. Molded on the back side of the cluster gear are radial and annular reinforcements. Alternate radial reinforcements extend from a hub like spokes of a wheel and circumferentially coincide with the spur gear teeth. One annular reinforcement positioned generally midway between the center and the outer edge of the gear extends in a full circle and projects axially outwardly farther than the remaining surface. This annular rib forms an axial bearing surface which transmits axial loads into the support structure making separate additional bearings unnecessary. In addition, this rib assists in making the drive assembly self-locking by providing a light frictional drag which retards back driving efficiency. Further, the rib reduces the backlash variation.

These and other objects and advantages of the present invention will be better understood by reference to the following detailed description taken in conjunction with the following drawing.

DETAILED DESCRIPTION OF THE INVENTION

The compact gear drive assembly of the present invention consists of three basic components: a drive pinion 10, a cluster gear 12 and an output gear 14. The input gear set for the drive assembly consists of a pair of skew axis gears which includes the pinion 10 and a face gear 16 which is a part of cluster gear 12. These gears are generally made in accordance with the teachings of U.S. Pat. No. 2,954,704 which is hereby incorporated by reference.

Figure 2:
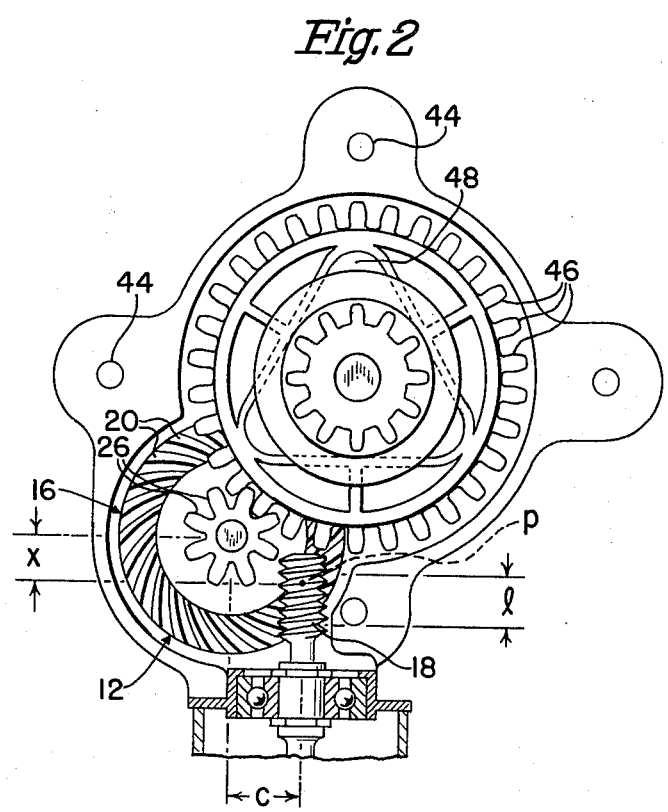
FIG. 2 is a front view of the gear drive shown in FIG. 1 with the cover removed.
Figure 3:
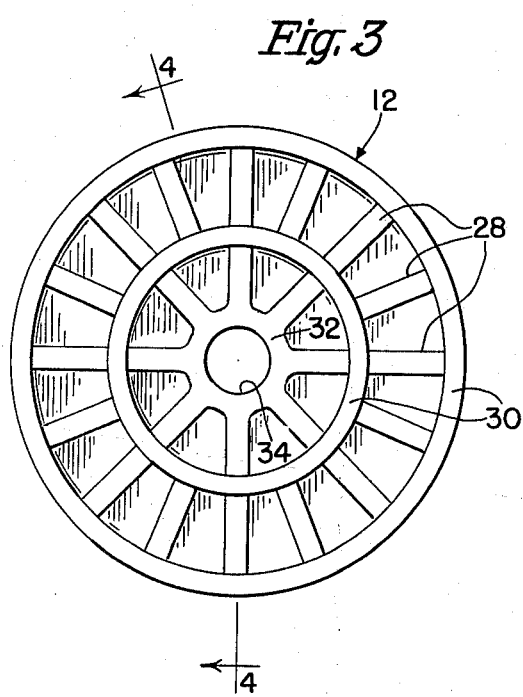
FIG. 3 is an enlarged rear view of the cluster gear.

Pinion 10 has generally a cylindrical configuration with one or more helical threads 18, "n" in number, extending about the periphery of the pinion. The pinion has a radius "r" an effective length "l" which shall be explained in more detail herebelow. The acute angle "$\alpha$" between the pinion thread and a plane perpendicular to the axis of the pinion is known as the thread angle. The thread of the drive is unsymetrical in cross section forming two different normal pressure angles "$\phi$", with respect to a line perpendicular to the pinion axis, "$\phi_1$" being the low pressure angle and "$\phi_2$" the high pressure angle. The terms "low" and "high" relate to the size of the angle, $\phi_2$ being generally larger than $\phi_1$. This drive assembly is a right-hand system and, accordingly, rotation of the pinion 10 in a clockwise direction as viewed from the bottom of FIG. 2 will cause the high pressure angle $\phi_2$ to engage and rotate face gear 16 in a clockwise direction as shown in FIG. 2.

The face gear 16 has generally curved teeth 20 projecting axially from base plane 22 beginning at a radius $R_r$ and extending outwardly to the full diameter of the face gear, $R_o$. The speed ratio between the pinion and the face gear, K, is equal to the ratio of teeth in gear 16 to the number "n" of threads 18 on the pinion 10. The amount the axis of the pinion is offset from a central or diametral axis of the face gear which is parallel thereto is denoted by "C". The point "p" is known as the "pitch point" and is located, moving downwardly (as shown in FIG. 2) along the axis of the pinion 10, at a point roughly one-third of the length of the pinion from the upper end and between the inside radius $R_r$ and outside radius $R_o$ of face gear 16. The distance the pitch point lies from a second diametral axis perpendicular to the first, is denoted by "x".

The lead "L" of the pinion, the distance between adjacent convolutions of the same pinion thread, can be expressed in terms of the input gear set's parameters by the following equation:

$$L = \frac{2\pi C}{K - \frac{x}{r}}.$$

The effective length "l" of the pinion is the portion of the pinion in which there is full thread engagement with the teeth of face gear 16. This length can be derived from the Pythagorean theorem to be $$l = \sqrt{R_o^2 - C^2} - \sqrt{R_r^2 - C^2}$$

It has been found that it is advantageous for the number of thread turns in simultaneous contact with the face gear to fall in the range between 8 and 1. That is, $$8 > \frac{l}{(L/n)} > 1$$

An important aspect of the invention is that the gear drive is self-locking. This eliminates the need for a brake, or other such means, to prevent the window from being pushed down or pulled up manually. The characteristics of the drive assembly most influencing self-locking are the material of the gears, the thread angle of the pinion and the pressure angle of the pinion thread. For the particular material used, as described more fully herebelow,, the drive assembly will be self-locking if the following relationship is satisfied:

$$\frac{\cos\phi}{\cot\alpha} \leq \mu$$

where $\mu$ is the coefficient of friction between the pinion and face gear at the time self locking is to occur. This relationship must be satisfied for both $\phi_1$ and $\phi_2$ if the gear drive is to lock against undesired movement in both directions. In addition, the thread angle $\alpha$ is further defined in terms of the above-noted parameters by the relationship $$\tan\alpha = \frac{C}{Kr - x}$$

For any contemplated arrangement, then, the parameters C, K, r, x and the angles $\alpha$, $\phi_1$ and $\phi_2$ are all interrelated by the expressions set forth above.

Figure 4:
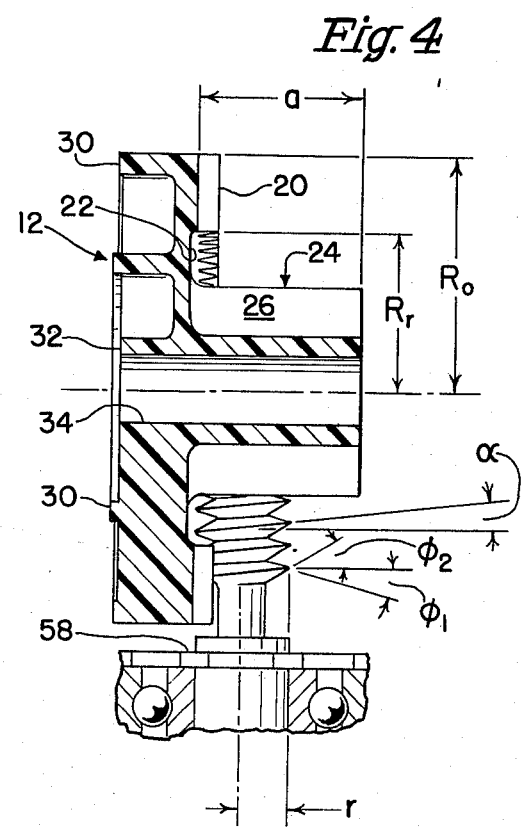
FIG. 4 is a cross sectional view of the cluster gear shown in FIG. 3 taken along line 4—4 with the drive pinion shown in engagement therewith.

The output gear set is a parallel axis arrangement which consists of a spur gear 24 and output gear 14. The spur gear has radially projecting teeth 26 which, as can be seen in FIG. 4, extend longitudinally outwardly from base plane 22 a predetermined distance "a". The teeth 20 of face gear 16 and teeth 26 of spur 24, therefore, have portions which overlap (i.e., extend in opposite directions across a vertical reference plane adjacent the base plane 22).

Figure 1:
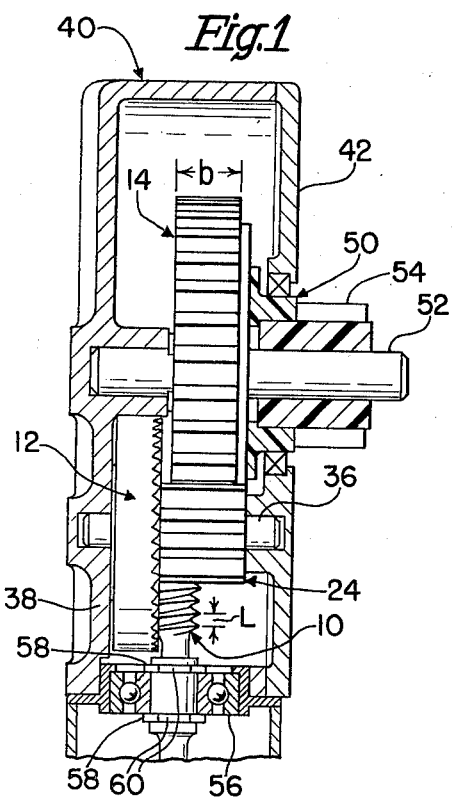
FIG. 1 is a full scale side view of the gear drive with a portion of the housing broken away to show the relative positions of the gears.

The face gear 16 and the spur gear 24 are integrally molded of a plastic material to form cluster gear 12. A plastic which has been found to be of sufficient strength to withstand the required loading and yet resilient enough not to break under peak shock loads is fiberglass reinforced nylon. Integrally molded on the back side of the cluster gear are radial reinforcements 28 and annular reinforcements 30. Alternate radial reinforcements 28 extend outwardly from a hub 32 which surrounds axial aperture 34 that receives mounting pin 36. These alternate reinforcements extend along the axes of spur teeth 26 thereby contributing significantly to the strength of the cluster gear. The innermost annular reinforcement rib 30 projects axially outwardly (FIG. 4) beyond the remaining surface and, as shown in FIG. 1, is in operative engagement with the back 38 of housing 40. This reinforcing rib acts as a bearing reacting any axial loading of the cluster gear into the housing 40 making additional bearings for this gear unnecessary. This contact also assists in making the gear drive self-locking by frictionally discouraging undesired rotation when a back drive condition exists. Note also that while the axial length of cluster gear is relatively constant, if the gear were mounted in a typical manner, the position of teeth 20 could vary significantly due to buckling of the gear. This buckling would create backlash resulting in contact of only 50% of the tooth depth or less. The use of bearing rib 30 substantially reduces the effects of backlash by its contact with the housing 40.

Cluster gear 12 may be press fit on pin 36 with the pin having rotating clearances in housing 40 or the pin may be press fit into the housing with the gear being rotatable thereon. Housing 40 has a removable cover plate 42 secured to the main body portion by fasteners (not shown) which pass through holes 44 in said body portion.

The output gear 14 is usually molded of a different plastic material used to make the cluster gear which may for example be DELDRIN ®. It was found to be necessary to use a different material in order to reduce the abrasive effects of one gear on another. The output gear has radially projecting teeth 46 which are compatible with and mesh with teeth 26 on spur gear 24. These teeth may have virtually constant relative curvature at all contact points as taught by U.S. Pat. No. 3,631,736 which disclosure is hereby incorporated by reference. The width "b" of the gear is less than the length "a" of spur teeth 26. In one face of the gear, there is a triangularly shaped recess 48 which receives a stabilizing bearing assembly 50 therein. Output gear 14 is rotatably mounted on pin 52 which is press fit in housing 40. Also mounted on the pin 52 is power take off gear 54 which is locked for rotation with gear 14 by the bearing assembly 50. Power take off gear 54 engages a large gear segment (not shown) which raises and lowers the window when the motor transmits torque through the drive assembly. It should be understood that the housing 40, stabilizing bearing assembly 50 and means for mounting the gears form no part of the present invention and are merely illustrated to facilitate understanding of the present invention.

The pinion 10 is mounted in a bearing 56. As shown in FIG. 4, radius "r" of the pinion is less than the length "a" of spur teeth 26. Snap on clip members 58 engage in grooves 60 of the pinion shaft and maintain it against axial displacement. The pinion, which is made of machine steel or a similar material, has one end which engages and is driven by a reversible high-speed motor (not shown) which is located in the lower section of the housing.

In operation, thread 18 of pinion 10 engages and drives the teeth 20 of face gear 16 which will also rotate spur gear 24. The teeth 26 of the spur engage teeth 46 of output gear 14 causing it and power take off gear 54 to rotate. The configuration of the pinion and gear makes the drive self-locking. The size and arrangement of the gears presents a compact gear drive which is at least 50% narrower than existing window actuators. This overall reduction in size is accompanied by an increase in gear reduction capability (a reduction on the order of 115 to 200 to 1, with larger reductions being possible), a 50% decrease in weight, a decrease in the size of the motor necessary, a decrease in the overall cost, and a more versatile, durable drive assembly. By properly selecting the various gear ratios, the forward driving efficiency can be maximized. By way of example and not limitation, the gear ratio between the input gears can be 31 to 1 and between the output gears of 4¼ to 1, producing an overall reduction in excess of 130 to 1.

While the invention has been described in conjunction with a specific embodiment thereof, it will be apparent to a person of ordinary skill in the art that many alternatives, modifications and variations are possible. Accordingly, it is intended that the above disclosed invention embrace all such alternatives, modifications, and variations as fall within the spirit and scope of the appended claims.

I claim:

1. A compact gear drive assembly for use in a window actuator or the like comprising two gear sets, a skew axis input gear set and a parallel axis output gear set; said input gear set including a drive pinion and a face gear; said output gear set including a spur gear and an output gear; the face gear of the input gear set and the spur gear of the output gear set being coaxial and forming a cluster gear; said face gear having a base plane out of which gear teeth project; the spur gear having radially projecting teeth which extend longitudinally out of the base plane of said face gear a predetermined distance thereby overlapping the teeth of said face gear; the drive pinion having a diameter which is less than said predetermined distance; the output gear having radially projecting teeth which are designed to mesh with and be driven by the teeth of said spur gear, said output gear having a thickness which is also less than said predetermined distance such that the gear drive assembly has a generally flat, compact configuration.

2. The compact gear drive assembly as set forth in claim 1 wherein the cluster gear and output gear are molded of plastic material.

3. The compact gear drive assembly as set forth in claim 2 wherein the face gear and spur gear of the cluster gear are integrally molded as a unit.

4. The compact gear drive assembly as set forth in claim 2 wherein the plastic material used in the cluster gear is different from the plastic material used in the output gear.

5. The compact gear drive assembly as set forth in claim 1 wherein the other side of said cluster gear has annular and radial reinforcement ribs integrally molded thereon.

6. The compact gear drive assembly as set forth in claim 5 wherein at least some of the radial ribs extend along the axes of the spur gear teeth.

7. The compact gear drive assembly as set forth in claim 5 wherein one of annular ribs comprises a ring located generally midway between the central axis and the rim and projecting axially outwardly.

8. The compact gear drive assembly as set forth in claim 7 wherein said annular rib forms a bearing surface which helps to react axial loading into a support structure and assists in preventing undesired back driving rotation of the gears.

9. The compact gear drive assembly as set forth in claim 1 wherein the various gears have gear ratios capable of producing an overall input-output reduction of between 115 and 200 to 1.

10. The compact gear drive assembly of claim 1 wherein said drive is self-locking as a result of the fact that $$\frac{\cos\phi}{\cot\alpha} \leq \mu$$

where
$\mu$ is the coefficient of friction between the pinion and face gear at the time self-locking occurs,
$\phi$ is the normal pressure angle; and $\alpha$ is the thread angle; said thread angle being further defined by the relationship $$\tan\alpha = \frac{C}{Kr - x}$$

where
C is the center distance, the length of a line drawn between, and perpendicular to both, the axis of the pinion and the axis of the face gear;
K is the ratio of the teeth in the face gear to the number of threads on the pinion;
r is the radius of the pinion thread;
x is the distance from (a) the diametral plane of the face gear that is orthogonical to the plane containing the pinion axis to (b) the pitch point.

11. The compact gear drive assembly of claim 1 wherein the skew axis gear set satisfy the following equations:

$$L = \frac{2\pi C}{K - \frac{x}{r}},$$

$$l = \sqrt{R_o^2 - C^2} - \sqrt{R_r^2 - C^2},$$

$$8 > \frac{1}{(L/n)} > 1$$

where
L is the pinion lead;
C is the center distance which is defined as the length of a line drawn between, and perpendicular to both, the axis of the pinion and the axis of the face gear;
K is the ratio of the number of teeth in the face gear to the number of threads on the pinion;
x is the distance from the diametral plane of the face gear which is orthogonal to the plane containing the pinion axis to the pitch point;
r is the outside radius of the pinion thread; is the effective pinion length;
$R_o$ is the outside radius of the face gear;
$R_r$ is the inside radius of the teeth on the face gear;
n is the number of pinion threads.

* * * * *